United States Patent [19]

Baardman et al.

[11] Patent Number: 5,750,642
[45] Date of Patent: May 12, 1998

[54] PROCESS FOR THE PREPARATION OF COPOLYMERS

[75] Inventors: Frank Baardman; Jayne Jubb, both of CM Amsterdam, Netherlands

[73] Assignee: Shell Oil Company, Houston, Tex.

[21] Appl. No.: 801,976

[22] Filed: Feb. 19, 1997

[30] Foreign Application Priority Data

Feb. 29, 1996 [EP] European Pat. Off. ............. 96200529

[51] Int. Cl.⁶ .......................... C08G 67/02; C08K 5/49
[52] U.S. Cl. .......................... 528/392; 528/220; 524/701; 524/706; 524/709; 524/711; 524/773; 524/785; 502/167
[58] Field of Search ........................... 528/220, 392; 524/701, 706, 709, 711, 773, 785; 502/167

[56] References Cited

U.S. PATENT DOCUMENTS 5,658,982  8/1997  Baardman et al. ..................... 524/711
5,670,611  9/1997  Baardman et al. ..................... 528/392

*Primary Examiner*—Samuel A. Acquah

[57] ABSTRACT

A process for the preparation of copolymers of carbon monoxide with an olefinically unsaturated compound comprising copolymerizing the monomers in the presence of a catalyst composition based upon (a) a salt of a Group VIII metal, and
(b) a cation which is selected from cationic oxidants and cations of the general formulae $R_nH_{4-n}N^+$, $R_mH_{3-m}C^+$ and $R_mH_{3-m}O^+$, wherein n is 0, 1, 2, 3 or 4, m is 2 or 3, and R represents a hydrocarbyl group and/or two or three of R together with the atom carrying a positive charge represent a ring structure, on the understanding that when n is 3, at most two of R together with nitrogen represent a heterocyclic ring structure, and when n is 4, three of R together with nitrogen represent an aromatic heterocyclic ring structure.

20 Claims, No Drawings

PROCESS FOR THE PREPARATION OF COPOLYMERS

FIELD OF THE INVENTION

The invention relates to a process for the preparation of copolymers of carbon monoxide with an olefinically unsaturated compound, and to a catalyst composition.

BACKGROUND OF THE INVENTION

Processes for the polymerization of carbon monoxide with an olefinically unsaturated compound catalysed with a Group VIII metal containing catalyst composition are well known in the art. EP-A-121965, EP-A-248483 and EP-A-254343 are examples of such processes. The copolymers so prepared are aliphatic copolymers wherein the monomer units originating from carbon monoxide and the monomer units originating from the olefinically unsaturated compounds occur in alternating or substantially alternating order.

EP-A-254343 proposes a process using a catalyst composition comprising (a) a salt of a Group VIII metal, and
(b) a tetrahydrocarbylammonium or a tetrahydrocarbylphosphonium cation. It appears, however, that in these processes the yield of polymer was very low sometimes.

Brookhart et al., J. Am. Chem. Soc., 114 (1992) 5894/5 disclosed the conversion of a zerovalent dimethylpalladium complex into a cationic monomethylpalladium complex by reaction with an equimolar quantity of dimethyloxonium tetrakis[3,5-bis(trifluoromethyl)phenyl]borate. The dimethyloxonium cations were thereby converted to dimethylether, so that no oxonium cations were present in the composition thus obtained and in the subsequent copolymerization of carbon monoxide with tert.-butylstyrene which was catalyzed with the composition.

Similar chemistry is taught in the non-prepublished patent application EP-95202473.5, in this case diphenylmethylammonium cations were converted to diphenylmethylamine. EP95202473.5 further proposes a copolymerization process in which the catalyst composition is based upon a cation of a Group VIII metal and a boron containing anion. Trihydrocarbylboranes are shown to function as a source of boron containing anions when the catalyst composition further includes a tertiary amine or a tertiary phosphine, and water, an alcohol, an oxime or a mercaptan. The neutral amine or phosphine is thought to be converted thereby into a tertiary ammonium or phosphonium cation.

GB-A-2247890 discloses that oxidizing compounds, in particular nitrosyl tetrafluoroborate, can assist in the extraction of palladium residues from copolymers of carbon monoxide with an alkene. This document, however, does not teach the copolymerization of carbon monoxide and an alkene in the presence of palladium and a cationic oxidizing species.

It has now been found that a substantial improvement of the performance of the catalyst compositions of EP-A-254343 can be achieved by replacing the tetrahydrocarbylammonium or—phosphonium cation with yet different cationic species.

SUMMARY OF THE INVENTION

The invention is a process for the preparation of copolymers of carbon monoxide with an olefinically unsaturated compound comprising copolymerizing the monomers in the presence of a catalyst composition comprising:

(a) a salt of a Group VIII metal, and
(b) a cation which is selected from cationic oxidants and cations of the formulae $R_nH_{4-n}N^+$, $R_mH_{3-m}C^{3O}$ and $R_mH_{3-m}O^+$, wherein n is 0, 1, 2, 3 or 4, m is 2 or 3, and R rep hydrocarbyl group and/or two or three of R together with the atom carrying a positive charge represent a ring structure, provided that when n is 3, at most two of R together with nitrogen represent a heterocyclic ring structure, and when n is 4, three of R together with nitrogen represent an aromatic heterocyclic ring structure.

In another aspect of the invention, a catalyst composition is presented which comprises (a) a salt of a Group VIII metal, and p1 (b) a cation which is selected from cations of the formulae $R_nH_{4-n}N^+$, $R_mH_{3-m}C^+$ and $R_mH_{3-m}O^+$, wherein n is 1, 2, 3 or 4, m is 2 or 3, and R represents a hydrocarbyl group and/or two or three of R together with the atom carrying a positive charge represent a ring structure, provided that when n is 3, at most two of R together with nitrogen represent a heterocyclic ring structure, and when n is 4, three of R together with nitrogen represent an aromatic heterocyclic ring structure.

In yet another aspect of the invention a catalyst composition is presented comprising:

(a) a salt of a Group VIII metal,
(b) a cation which is selected from cationic oxidants and cations of the formulae $R_nH_{4-n}N^+$, $R_mH_{3-m}C^+$ and $R_mH_{3-m}O^+$, wherein n is 0, 1, 2, 3 or 4, m is 2 or 3, and R represents a hydrocarbyl group and/or two or three of R together with the atom carrying a positive charge represent a ring structure, provided that when n is 3, at most two of R together with nitrogen represent a heterocyclic ring structure, and when n is 4, three of R together with nitrogen represent an aromatic heterocyclic ring structure, and
(c) a ligand which contains at least two dentate groups which can form a complex with the Group VIII metal.

DETAILED DESCRIPTION OF THE INVENTION

Nickel and cobalt are examples of suitable Group VIII metals for use in the process according to this invention. The Group VIII metal is preferably a noble Group VIII metal, of which palladium is most preferred.

Suitable salts of a Group VIII metal include salts of mineral acids such as sulphuric acid, nitric acid, phosphoric acid, perchloric acid and sulphonic acids, and organic salts, such as acetylacetonates. Preferably, a salt of a carboxylic acid is used, for example a carboxylic acid with up to 8 carbon atoms, such as acetic acid, trifluoroacetic acid, trichloroacetic acid, propionic acid, benzoic acid and citric acid. The Group VIII metal salt may be a complex salt. Palladium (II) acetate is a particularly preferred palladium salt.

As noted above, the catalyst compositions according to this invention further comprises a cationic oxidant or a cation according to one or more of the general formulae given. In general, in the formulae given, hydrocarbyl groups R comprise typically up to 20 carbon atoms, more typically 1 to 15 carbon atoms. The hydrocarbyl groups R may represent alkyl, aryl, alkaryl, aralkyl or cycloalkyl groups. The hydrocarbyl groups R may or may not be branched. They may carry substituents, such as hydrocarbyloxy groups or halogen atoms. Typically, they are unsubstituted. When there are two or more hydrocarbyl groups R they may be the same or different. When two or three of R together with the atom carrying the positive charge represent a ring structure this ring structure may comprise a 5-, 6- or 7-membered ring, and the ring may or may not be a heterocyclic ring and it may be an aromatic or a non-aromatic ring. Such rings may or may not carry further substituents, such as hydrocarbyl groups, hydrocarbyloxy groups and halogen atoms and they may or may not be fused with other ring systems, for example aromatic rings. If desired, a heterocyclic ring may comprise more than one heteroatom. The ring structures comprise typically up to 30 carbon atoms, in particular 4 to 25 carbon atoms.

Further preferences may depend to some extent on the type of cation involved. Some of the cations according to this invention may be unstable; in such cases the further preferences relate to the desirability of having cations of sufficient stability. In general, the stability will be determined by electronic and steric factors. A satisfactory level of stability may be accomplished, for example, by the presence of unsaturation, in particular to the extent that there is stabilization by resonance. The stability of cations which do not carry a hydrogen atom at the charged atom may be satisfactory when there are no hydrogen atoms attached to the atoms which are immediately neighbouring the charged atom.

One type of cations is of the formula $R_nH_{4-n}N^+$, wherein n is 0, 1, 2 or 3 and R represents a hydrocarbyl group and/or two or three of R together with the nitrogen atom represent a heterocyclic ring structure, provided that when n is 3, at most two of R together with nitrogen represent a ring structure. Preferred hydrocarbyl groups R are aryl or alkaryl groups, such as phenyl, 2-tolyl, 2,4-xylyl and 1-naphthyl groups, or alkyl groups, in particular n-alkyl groups, such as methyl, ethyl, 1-propyl or 1-butyl groups. They are most preferably phenyl groups or methyl groups. The ring structures comprise typically a pyrrole, pyrrolidine or piperidine ring. Typical examples of the cations of this type are ammonium (i.e. n is 0), diphenylammonium (i.e. n is 2) and trimethylammonium and triethylammonium (i.e. n is 3). It is preferred that n is 3 and at least one, in particular at least two, of the hydrocarbyl groups R is an aryl group. Examples of such preferred cations are 1-phenylpiperidinium, triphenylammonium and dimethylphenylammonium (i.e. N,N-dimethylanilinium).

Another type of cation is of the formula $R_nH_{4-n}N^+$, wherein n is 4, three of R together with the nitrogen atom represent an heterocyclic aromatic ring and the fourth R represents a hydrocarbyl group. In this type of cation the hydrocarbyl group R is preferably a branched alkyl or aralkyl group, for example a tertiary butyl group or a 2-phenylprop-2-yl group, in particular a triphenylmethyl group. The heterocyclic aromatic ring structure may be that of pyridine, a substituted pyridine or a fused pyridine. Examples are the ring structures of 2-, 3- or 4-picoline, quinoline, isoquinoline and dibenzopyridine, in particular pyridine. A preferred cation is 1-(triphenylmethyl) pyridinium.

Another type of cation is of the formula $R_mH_{3-m}C^+$ wherein m is 2 or 3 and R represents a hydrocarbyl group and/or two or three of R together with the charged carbon atom represent a ring structure. When m is 3 the hydrocarbyl groups R are preferably aryl groups, such as 2-tolyl, 2,4-xylyl and 1-naphthyl groups, in particular phenyl groups. Thus, an example of a preferred carbonium ion of this type is triphenylcarbonium. When m is 2 it is preferred that the two R together with the charged carbon atom represent a ring structure, for example a 7-membered ring, preferably containing unsaturation. An example of a preferred cation of this type is a tropylium cation, in particular the tropylium cation ($C_7H_7^+$).

Another type of cations is of the general formula $R_mH_{3-m}O^+$, wherein m is 2 or 3 and R represents a hydrocarbyl group and/or two or three of R together with the oxygen atom represent a heterocyclic ring. When all R represent hydrocarbyl groups they are in particular n-alkyl groups, such as methyl, ethyl, 1-propyl and 1-butyl groups. Example of cations of this type are dimethyloxonium (m is 2) and, in particular, trimethyloxonium (m is 3). In an attractive alternative all three R (m is 3) together with the oxygen atom represent a ring structure, such as an aromatic 6-membered ring which is preferably substituted, for example with one or more (alk)aryl groups, or fused with another aromatic ring. Examples of cations of this type are 2,4,6-triphenylpyrylium, xanthylium and flavylium.

Yet another type of cation which may suitably be used in this invention are cationic oxidants. Preferred cations of this type comprise nitrogen and oxygen, more in particular consisting of nitrogen and oxygen. Examples of such cations are nitryl ($NO^{2+}$) and, in particular, nitrosyl ($NO^+$).

Without wishing to be bound to theory, it is believed that, in the cases of cations of which the charged atom carries a hydrogen atom, the $pK_b$ value of the conjugated base plays a role in determining the rate of polymerization which can be achieved. It would appear that the $pK_b$ of the conjugated base is preferably at least 2, more preferably at least 6 and most preferably at least 8, when determined in aqueous solution at 25° C. This applies in particular to cations of the general formula $R_nH_{4-n}N^+$, wherein n is 0, 1, 2 or 3 and R is as defined above.

The quantity of the cation which may be used in the catalyst composition may vary within wide limits. There is a preference for using 0.1–50 equivalents of cation per gram atom of Group VIII metal. Even more preferred is a quantity between about 0.5–25 equivalents on the same basis.

The cations according to this invention may be introduced in the catalyst composition in the form of a salt. Suitable salts have as a counterion an anion which may function in the catalyst component as a further component. Alternatively, the cation may be formed in situ.

The Group VIII metal containing catalyst composition is typically based on a source of anions as a further catalyst component. Suitable anions are those which are noncoordinating or only weakly coordinating with the Group VIII metal under the conditions of the copolymerization. Examples of suitable anions are anions of protic acids, which include acids which are obtainable by combining a Lewis acid and a protic acid, and acids which are adducts of boric acid and a 1,2-diol, a catechol or a salicylic acid. Preferred acids are strong acids, i.e. those which have a pKa of less than 6, preferably less than 4, and more preferably less than 2, when measured in aqueous solution at 18° C. Examples of suitable protic acids are the above mentioned acids which may also participate in the Group VIII salts, e.g. perchloric acid and trifluoroacetic acid. Examples of Lewis acids which can be combined with a protic acid are boron trifluoride, boron pentafluoride, aluminium trifluoride and arsenic pentafluoride. Examples of protic acids which may be combined with a Lewis acid are sulphonic acids and hydrohalogenic acids, in particular hydrogen fluoride. Suitable combinations of a Lewis acid with a protic acid are tetrafluoroboric acid and hexafluoroboric acid ($HBF_4$ and $HBF_6$). Other suitable anions are anions of which it appears that there are no stable conjugated acids, such as tetrahydrocarbylborate anions or carborate anions. Borate anions may comprise the same or different hydrocarbyl groups attached to boron, such as alkyl, aryl, aralkyl, alkaryl and cycloalkyl groups. Preferred are tetraarylborates, such as tetraphenylborate, tetrakis[3,5-bis(trifluoromethyl)phenyl] borate and tetrakis(perfluorophenyl)borate, and carborate ($B_{11}CH_{12}$)

The source of anions may be an acid from which the anions are derivable, or their salts. Suitable salts include, for example, cobalt and nickel salts. A very suitable salt comprises a cation selected as the catalyst component (b) in accordance with this invention. Other sources of anions are suitably Lewis acids, such as halides, in particular fluorides, of boron, tin, antimony, aluminium or arsenic. Boron trifluoride and boron pentafluoride are very suitable. Other suitable Lewis acids are hydrocarbylboranes. The hydrocarbylboranes may comprise one hydrocarbyl group or two or three of the same or different hydrocarbyl groups attached to boron, such as alkyl, aryl, aralkyl, alkaryl and cycloalkyl groups, preferably aryl groups. They may also comprise hydrocarbyloxy or hydroxy groups or halogen atoms attached to boron. Examples of very suitable hydrocarbylboranes are triphenylborane, tris(perfluorophenyl)borane and tris[3,5bis(trifluoromethyl)phenyl]borane. Again other suitable compounds which may function as a source of anions are aluminoxanes, in particular methyl aluminoxanes and t-butyl aluminoxanes.

The quantity of the source of anions is preferably selected such that it provides in the range of from 0.1 to 50 equivalents of anions per gram atom of Group VIII metal. Preferably, they will provide from 0.5 to 25 equivalents of anions per gram atom of Group VIII metal. However, the aluminoxanes may be used in such a quantity that the molar ratio of aluminium to the Group VIII metal is in the range of from 4000:1 to 10:1, preferably from 2000:1 to 100:1.

The catalyst composition of the process according to this invention is preferably based, as another additional component, on a ligand which can form a complex with the Group VIII metal. It appears that the presence of two complexing sites in one ligand molecule significantly contributes to the activity of the catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal, in particular a dentate group of phosphorus. Suitably a bidentate ligand is used which contains two phosphorus-, nitrogen- or sulphur containing dentate groups. It is also possible to use a mixed bidentate ligand such as 1diphenylphosphino-3-ethylthiopropane.

A preferred group of bidentate ligands can be indicated by the formula

   (I)

In this formula $M^1$ and $M^2$ independently represent a phosphorus, nitrogen, arsenic or antimony atom, $R^1$, $R^2$, $R^3$ and $R^4$ independently represent a non-substituted or polar substituted hydrocarbyl group, in particular of up to 10 carbon atoms, and $R^5$ represents a bivalent organic bridging group containing at least 1 carbon atom in the bridge.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups. Preferably at least one of $R^1$, $R^2$, $R^3$ and $R^4$ represents an aromatic group, in particular an aromatic group which is polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more, and preferably each of $R^1$, $R^2$, $R^3$ and $R^4$ represents an aryl group, preferably a phenyl group, substituted at an ortho position with respect to M1 or M2 with an alkoxy group, especially a methoxy group.

In the ligands of formula (I), $R^5$ preferably represents a bivalent organic bridging group containing from 2 to 4 bridging atoms, at least two of which are carbon atoms. Examples of such groups $R^5$ are —CH2—$CH_2$—, —$CH_2$—$CH_2$—$CH_2$—, —$CH_2$—$C(CH_3)_2$—$CH_2$—, —$CH_2$—Si$(CH_3)_2$—$CH_2$—, and —$CH_2$—$CH_2$—$CH_2$—$CH_2$—. Preferably $R^5$ is a trimethylene group.

Preferred ligands are 1,3-bis[bis(2,4-dimethoxyphenyl) phosphino]propane, 1,3-bis[[bis(2,4,6-trimethoxyphenyl) phosphino]propane and, more preferred, 1,3-bis[bis(2-methoxyphenyl)phosphino]propane.

Other suitable bidentate ligands are nitrogen containing compounds of the general formula

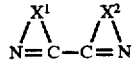

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2-bipyridine, 4,4'-dimethyl-2,2'-bipyridine, 4,4'-dimethoxy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Again other suitable bidentate ligands are sulphur containing compounds of the general formula

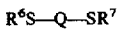

wherein $R^6$ and $R^7$ independently represent a non-substituted or polar substituted hydrocarbyl group and Q represents a bivalent bridging group containing 2 to 4 carbon atoms in the bridge. The groups $R^6$ and $R^7$ are preferably alkyl groups, each having in particular up to 10 carbon atoms. Very suitable bis thio compounds are 1,2-bis(ethylthio)ethane and 1,2-bis(propylthio)ethene.

The amount of bidentate ligand supplied may vary considerably, but is usually dependent on the amount of Group VIII metal present in the catalyst composition. Preferred amounts of bidentate ligands are in the range of from 0.5 to 8, more preferably in the range of from 0.5 to 2 moles per gram atom of Group VIII metal, unless the bidentate ligand is a nitrogen bidentate ligand, in which case the bidentate ligand is preferably present in an amount of from 0.5 to 200 and in particular 1 to 50 moles per gram atom of Group VIII metal. The monodentate ligands are preferably present in an amount of from 0.5 to 50 and in particular I to 25 moles per gram atom of Group VIII metal.

The amount of catalyst composition used in the process of the invention may vary between wide limits. Recommended quantities of catalyst composition are in the range of $10^{-8}$ to $10^{-2}$, calculated as gram atoms of Group VIII metal per mole of olefinically unsaturated compound to be copolymerized with carbon monoxide. Preferred quantities are in the range of $10^{-7}$ to $10^{-3}$ on the same basis.

The performance of Group VIII metal catalyst compositions in the copolymerization process may be improved by introducing an organic oxidant, such as a quinone or an aromatic nitro compound. Preferred oxidants are quinones selected from the group consisting of benzoquinone, naphthoquinone and anthraquinone. The quantity of oxidant is advantageously in the range of from 1 to 50, preferably in the range of from 1 to 20 mole per gram atom of metal of Group VIII.

Olefinically unsaturated compounds which can be used as monomers in the copolymerization process of the invention include compounds consisting exclusively of carbon and hydrogen and compounds which in addition comprise hetero atoms, such as unsaturated esters, ethers and amides. Unsaturated hydrocarbons are preferred. Examples of suitable olefinic monomers are lower olefins, such as ethene, propene and butene-1, cyclic olefins such as cyclopentene, aromatic compounds, such as styrene and α-methylstyrene and vinyl esters, such as vinyl acetate and vinyl propionate. Most preference is given to ethene and mixtures of ethene with another olefinically unsaturated compound, in particular an α-olefin, such as propene or butene-1. The term "lower" as used in this specification with reference to organic compounds refers to such a compound containing up to 6 carbon atoms.

The molar ratio of carbon monoxide to olefinically unsaturated compound(s) used as monomer is typically selected in the range of 1:5 to 5:1. Preferably the molar ratio is in the range of 1:2 to 2:1, substantially equimolar ratios being preferred most.

The copolymerization process of this invention may be carried out in the presence of a liquid diluent. It may also be carried out as a gas phase process. If it is carried out in the presence of a liquid diluent preferably a liquid diluent is used in which the copolymer to be prepared forms a suspension, in which case a diluent may be selected in which the copolymer is insoluble or virtually insoluble. Examples of liquid diluents are ketones (e.g. acetone or methylethylketone), esters (e.g. ethyl acetate), ethers (e.g. diethylether, tetrahydrofuran or diethylene glycol dimethyl ether), chlorinated hydrocarbons (e.g. chloroform or dichloromethane), aromatics (e.g. toluene, benzene, chlorobenzene) and protic diluents, such as lower alcohols (e.g. methanol and ethanol). Protic diluents are preferred. Mixtures of liquid diluents may be used as well, for example protic diluents may comprise an aprotic diluent. Further, according to the teaching of EP-A-254343, ethers, ketones and esters may increase the rate of polymerization.

When the process of the invention is carried out as a gas phase process it is preferred to use a catalyst system supported on a solid carrier, usually in order to facilitate the introduction of the catalyst system into the reactor.

Suitable carrier materials may be inorganic, such as silica, alumina or charcoal, or organic such as cellulose or dextrose. Furthermore a polymer material may be used as carrier, such as polyethene, polypropene or, in particular, copolymers of carbon monoxide with an ethylenically unsaturated compound, for example linear alternating copolymers of carbon monoxide with ethene or carbon monoxide with ethene and propene or butene-1.

The carrier can be impregnated with a solution of the catalyst system in a suitable liquid. The amount of liquid used is relatively small so that any excess can easily be removed before or during the initial stage of the copolymerization process. On the other hand, the addition of a minor amount of liquid during the copolymerization process can have a delaying effect on the catalyst deactivation, if there is any, the quantity of liquid being so small that the gas phase is the continuous phase during the polymerization. The quantity of liquid is in particular selected such that it is 20–80% by weight, more preferably 40–60% by weight, of the quantity which is sufficient to saturate the gas phase under the conditions of the polymerization. Polar liquids are preferred, such as lower alcohols, ethers, ketones and esters. Examples of such liquids are indicated hereinbefore in relation to the diluents which may be used when the process is carried out as a liquid phase polymerization.

The copolymerization process is typically carried out at a temperature between 20° and 200° C., preferably at a temperature in the range of from 30° to 150° C., and usually applying a pressure between 0.2 and 20 MPa, pressures in the range of from 1 to 10 MPa being preferred.

The copolymer may be recovered from the polymerization mixture by any suitable conventional technique.

The copolymers obtained according to the invention are particularly suitable as thermoplastics for fibres, films or sheets, or for injection moulding, compression moulding and blow moulding applications. They may be used for applications in the automotive industry, for the manufacture of packaging materials for food and drinks and for various uses in the domestic sphere.

The invention is further illustrated by means of the following nonlimiting examples.

EXAMPLES 1–21

(Examples 1, 2, 12, 13 and 16 are Comparative Examples)

A linear alternating copolymer of carbon monoxide with ethene was prepared as follows.

A catalyst solution was prepared as follows: 57.4 mg (0.11 mmole) of 1,3-bis[bis(orthomethoxyphenyl)phosphino]pro was dissolved in 2.5 ml of tetrahydrofuran. After complete dissolution, 22.0 mg (0.10 mmole) of palladium (II) acetate was added and the resultant mixture was stirred for 30 minutes. Then 17.5 ml of methanol was added and the mixture was stirred during 1 hour. Subsequently 0.25 mmole of a salt as specified in Table I was dissolved in the mixture and the resulting solution was stirred for another 15 minutes.

In a 0.3–1 autoclave, 1 ml of the resulting catalyst solution and (subsequently) 1 ml of methanol were dribbled over 5 gram of a dried, previously prepared reactor powder of a copolymer of carbon monoxide and ethene. The autoclave was equipped with a helical stirrer and an automatic pressure relief.

The reactor was then closed and pressurized at 5.0 MPa with nitrogen. The pressure was released and the autoclave was purged with carbon monoxide (1.0 MPa), after which it was pressurized with carbon monoxide (2.0 MPa) and ethene (2.0 MPa).

The contents of the reactor were heated to 90° C. At the moment that the temperature reached 55° C., a supply of carbon monoxide/ethene feed (molar ratio 1:1) was started to maintain the pressure at 4.0 MPa absolute. The beginning of the reaction was defined as the moment that the temperature of the reaction mixture reached 60° C.

The copolymerization reaction was stopped by automatic pressure relief after a reaction period of 2 hours. The product was recovered, dried overnight in a vacuum oven under a nitrogen purge at 50° C. and weighed.

The average polymerization rate in kg copolymer per gram palladium per hour was calculated from the yield of copolymer. The results are shown in Table I. When applicable, the Table also shows the pKb value of the conjugate base of the cations, measured at 25° C. in aqueous solution.

$^{13}$C-NMR analysis confirmed that the copolymers obtained were linear polymers of which the chains consisted of monomer units of carbon monoxide and monomer units of ethene arranged in an alternating order.

TABLE I

| Example | Salt | pKb | Rate kg/(g Pd.h) |
|---|---|---|---|
| | Tetrafluoroborates: | | |
| 1*) | tetrabutylammonium | | <0.5 |
| 2*) | tetraphenylphosphonium | | <0.5 |
| 3 | triethylammonium | 3 | 4 |
| 4 | ammonium | 4.8 | 9 |
| 5 | dimethylphenylammonium | 9 | 12 |
| 6 | triphenylammonium | 10 | 12 |
| 7 | triphenylcarbonium (trityl) | | 13 |
| 8 | 2,4,6-triphenylpyrylium | | 9 |
| 9 | trimethyloxonium | | 14 |
| 10 | nitrosyl | | 16 |
| 11 | 1-(triphenylmethyl)pyridinium | | 11 |
| | Hexafluoroborates: | | |
| 12*) | tetramethylammonium | | <0.5 |
| 13*) | tetrabutylammonium | | <0.5 |
| 14 | dimethylphenylammonium | 9 | 11 |
| 15 | tropylium | | 12 |
| | Tetraphenylborates: | | |
| 16*) | tetraphenylphosphonium | | <0.5 |
| 17 | trimethylammonium | 4.2 | 7 |
| 18 | ammonium | 4.8 | 6 |
| | Tetrakis(perfluorophenyl)borates: | | |
| 19 | dimethylphenylammonium | 9 | 16 |
| 20 | triphenylcarbonium (trityl) | | 10 |
| | Perchlorates: | | |
| 21 | dimethylphenylammonium | 9 | 13 |

*) For comparison

What is claimed is:

1. A process for the preparation of copolymers of carbon monoxide and olefinically unsaturated compounds comprising copolymerizing the monomers in the presence of a catalyst composition comprising:
   (a) a salt of a Group VIII metal, and
   (b) a cation which is selected from cationic oxidants and cations of the formulae $R_nH_{4-n}N^+$, $R_mH_{3-m}C^+$ and $R_mH_{3-m}O^+$, wherein n is 0, 1, 2, 3 or 4, m is 2 or 3, and R represents a hydrocarbyl group.

2. The process of claim 1 wherein two or three of R together with the atom carrying a positive charge represent a ring structure, provided that when n is 3, at most two of R together with nitrogen represent a heterocyclic ring structure.

3. The process of claim 2 wherein when n is 4, three of R together with nitrogen represent an aromatic heterocyclic ring structure.

4. A process as claimed in claim 1 wherein the Group VIII metal salt is a salt of palladium and a carboxylic acid.

5. A process as claimed in claim 1 wherein the cation is of the formula $R_nH_{4-n}N^+$, with n being 0, 1, 2 or 3, of which the conjugated base has a pKb value of at least 2 (as determined in aqueous solution at 25° C.

6. A process as claimed in claim 1 wherein n is 3 and at least one of the hydrocarbyl groups R is an aryl group.

7. A process as claimed in claim 1 wherein the cation is of the formula $R_nH_{4-n}N^+$, wherein n is 4, three of R together with the nitrogen atom represent a pyridine ring and the fourth R represents a hydrocarbyl group.

8. A process as claimed in claim 1 wherein the cation is of the formula $R_mH_{3-m}C^+$, m is 3 and R represents aryl groups.

9. A process as claimed in claim 1 wherein the cation is of the formula $R_mH_{3-m}C^+$, m is 2 and R together with the charged carbon atom represent a 7-membered ring.

10. A process as claimed in claim 1 wherein the cation is of the formula $R_mH_{3-m}O^+$, R represents a hydrocarbyl group, m is 3, three R together with the oxygen atom represent an optionally substituted aromatic 6-membered ring or an optionally substituted fused aromatic ring.

11. A process as claimed in claim 1 wherein the cation is a salt comprising an cationic oxidant containing nitrogen and oxygen.

12. The process of claim 11 wherein the cation is a nitrosyl salt.

13. A process as claimed in any of claims 1 wherein the cation is present in a quantity of 0.1–50 equivalents per gram atom of Group VIII metal.

14. A process as claimed in claim 1 wherein the catalyst composition further comprises a source of anions selected from the group consisting of protic acids, tetrahydrocarbylborate anions, carborate anions, Lewis acids and aluminoxanes.

15. A process as claimed in claim 14 wherein the anions are applied in a quantity of from 0.5 to 25 equivalents per gram atom of Group VIII metal.

16. A process as claimed in claim 1 wherein the catalyst composition further comprises as a source of anions aluminoxanes.

17. A process as claimed in claim 16 wherein aluminoxanes are applied in such a quantity that the molar ratio of aluminium to the Group VIII metal is in the range of from 2000:1 to 100:1.

18. A process as claimed in claim 1 wherein the catalyst composition further comprises a bidentate ligand of the formula $R^1R^2M^1$—$R^5$—$M^2R^3R^4$ (I), wherein $M^1$ and $M^2$ independently represent a phosphorus, nitrogen, arsenic or antimony atom, $R^1$, $R^2$, $R^3$ and $R^4$ independently represent a non-substituted or polar substituted hydrocarbyl group and $R^5$ represents a bivalent organic bridging group containing at least 1 carbon atom in the bridge.

19. A catalyst composition comprising:
   (a) a salt of a Group VIII metal, and
   (b) a cation which is selected from cations of the formulae $R_nH_{4-n}N^+$, $R_mH_{3-m}C^+$ and $R_mH_{3-m}O^+$, wherein n is 1, 2, 3 or 4, m is 2 or 3, and R represents a hydrocarbyl group.

20. A catalyst composition comprising:
   (a) a salt of a Group VIII metal, and
   (b) a cation which is selected from cations of the formulae $R_nH_{4-n}N^+$, $R_mH_{3-m}C^+$ and $R_mH_{3-m}O^+$, wherein n is 1, 2, 3 or 4, m is 2 or 3, and R represents a hydrocarbyl group, two or three of R together with the atom carrying a positive charge represent a ring structure, provided that when n is 3, at most two of R together with nitrogen represent a heterocyclic ring structure, and when n is 4, three of R together with nitrogen represent an aromatic heterocyclic ring structure.

* * * * *